United States Patent [19]

Chapman, Jr.

[11] 4,106,060
[45] Aug. 8, 1978

[54] ELECTRONIC MAIL BOX

[75] Inventor: Herbert Hill Chapman, Jr., Cherry Hill, N.J.

[73] Assignee: RCA Corporation, New York, N.Y.

[21] Appl. No.: 641,137

[22] Filed: Dec. 15, 1975

[51] Int. Cl.² ............................................. H04B 1/50
[52] U.S. Cl. .................................. 358/256; 358/259; 358/86; 325/4
[58] Field of Search ............... 178/5.1, 6, 5, DIG. 9; 343/100 ST; 340/146.3 F; 358/256, 86, 257, 259; 325/4

[56] References Cited

U.S. PATENT DOCUMENTS

| 2,290,317 | 7/1972 | Deakin | 178/DIG. 9 |
| 3,594,495 | 7/1971 | Bond | 358/257 |
| 3,641,432 | 2/1972 | Bond | 178/6 |
| 3,858,180 | 12/1974 | Spanjersberg | 340/146.3 F |

OTHER PUBLICATIONS

Siemens Videoset 101 "4-23-74".

Primary Examiner—Robert L. Griffin
Assistant Examiner—Edward L. Coles
Attorney, Agent, or Firm—H. Christoffersen; Joseph D. Lazar; Raymond E. Smiley

[57] ABSTRACT

An electronic mail box includes an entry slot for receiving a letter to be transmitted electronically to a remote point, an optical reader for converting the letter text to electronic signals, and a keyboard for receiving the address of the addressee. The address is checked for consistency. Then the text and the address are sent to the destination as determined by the address, where the letter is recreated to be delivered in the conventional manner.

6 Claims, 3 Drawing Figures

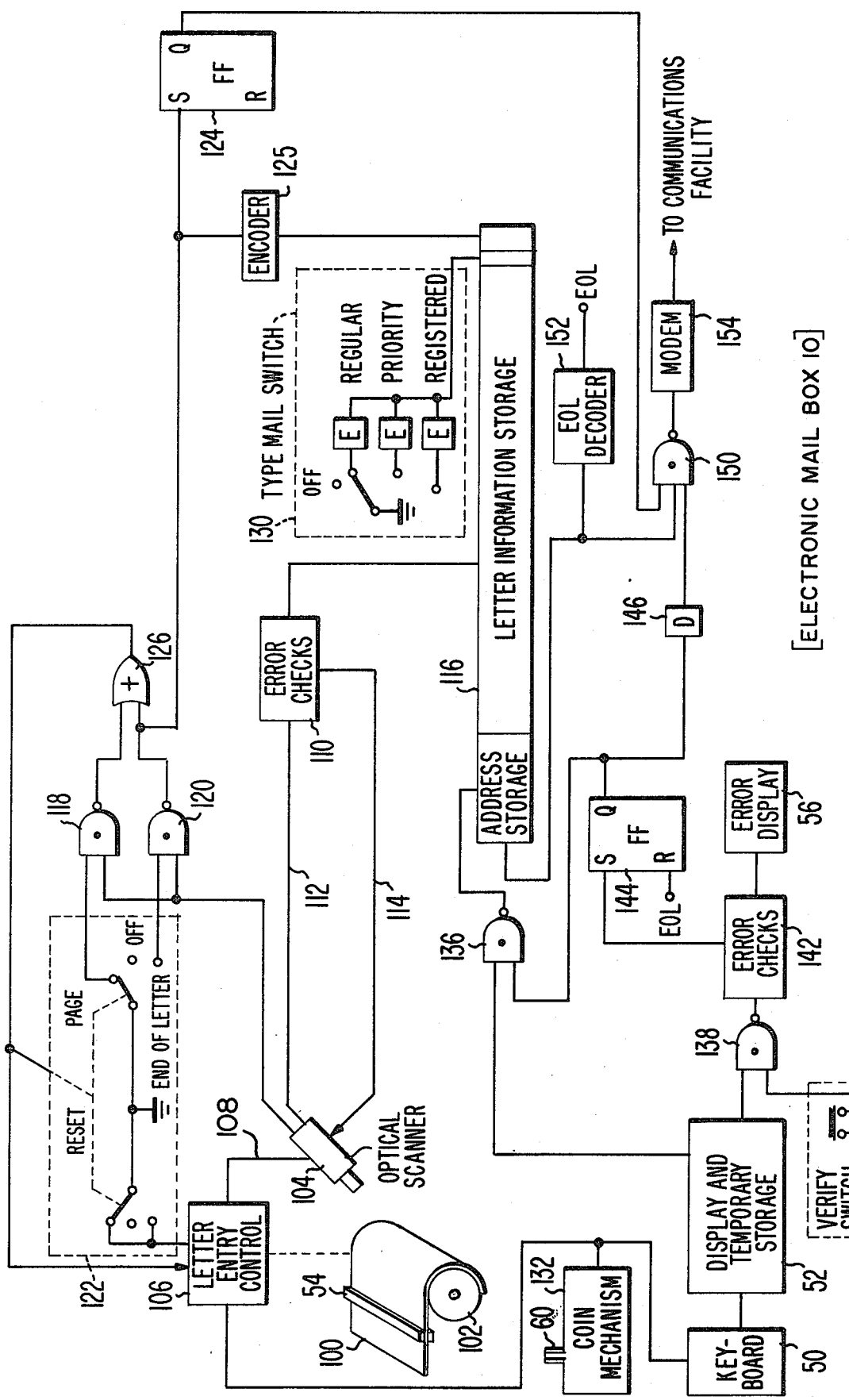

ELECTRONIC MAIL BOX

BACKGROUND OF THE INVENTION

The U.S. Postal Service (USPS) has expressed a need for an electronic mail system (EMS). Much mail starts out in electronic form, which is converted by the postal customer to human readable form. The human readable form, letters, bills, advertising, magazines, and so forth, are then inducted into the postal system to be physically moved around the country and ultimately delivered to the addressee. One object of EMS is to retain electronically generated mail in electronic form until it reaches the destination Post Office, that is, the one from which it will be delivered to the addressee. At the destination Post Office, the mail is for the first time translated into human readable form. Such a system is expected to result in faster mail delivered at a lower cost.

A large percentage of mail originates, however, in human readable form. This includes personal letters, business letters, and so-called turn-around documents. Such documents could be transmitted by facsimile, but this equipment is not generally considered to be operable by the average postal customer. Alternatively, a teletypewriting apparatus could be used, but this requires the postal customer to type his letter right at the terminal, which is rather time consuming. Thus, no readily adaptable electronic mailbox exists.

SUMMARY OF THE INVENTION

In accordance with the invention, there is provided an apparatus including a means for receiving a document to be transmitted in electronic form, a means for reading information from the document, and for converting it to electronic signals and a keyboard permitting entry by the postal customer of the address to which the document's contents are to be sent. Also included is a means for transmitting to a remote point determined by the address entered into the keyboard, the address and electronic signals.

BRIEF DESCRIPTION OF THE DRAWING

FIG. 3 is an electrical schematic of an electronic mail box constructed in accordance with the invention.

DETAILED DESCRIPTION OF A PREFERRED EMBODIMENT

Figure 1:
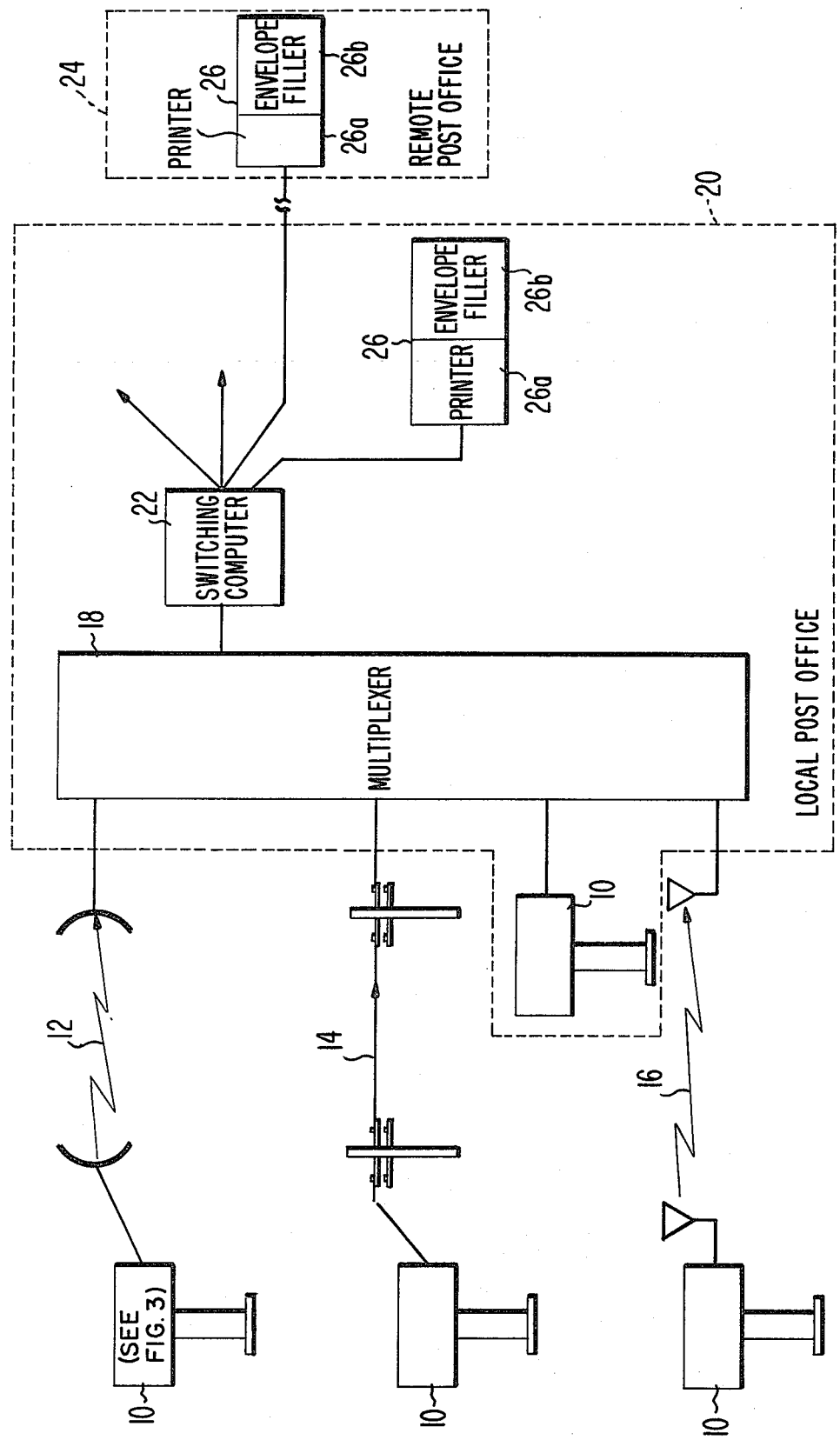
FIG. 1 is an electrical schematic illustrating relevant portions of an electronic mail system including the electronic mail box apparatus of the invention.

Referring to FIG. 1, a plurality of electronic mail boxes (EMB) 10 (four of which are shown) which will be described in detail in connection with FIGS. 2 and 3, may be located in public places, such as airports, banks, shopping centers, and Post Office lobbies, and in the offices of large volume mailing customers. These terminals are connected via conventional telecommunications links, such as microwave 12, telephone lines 14, or radio 16 to a multiplexer 18 of conventional design at the local Post Office shown schematically by a dashed line 20. Any terminal 10 located at the Post Office may, of course, be hard-wired directly to multiplexer 18. The multiplexer 18 is, in turn, coupled to a switching computer 22, which is again of conventional design. As will be described in more detail shortly, messages transmitted to the local Post Office 20 contain the address of the recipient of the messages also transmitted to the Post Office. Switching computer 22 uses Zip Code from the addressee information to route each message to the proper remote Post Office, such as the one in dashed lines legended 24, via any appropriate communications method. Some messages will, of course, be directed to customers at the local Post Office. One or more printer-envelope fillers 26 will be located at each Post Office adapted to translate messages received in electronic form into human readable form and stuff them into envelopes all without operator intervention, to maintain mail integrity. Units 26 may also be located at the offices of large mail volume addressees.

Printer portion 26a is of any conventional design, such as impact or impactless printers normally used with digital computers if the message is in digital form. Alternately, if the message is transmitted in a form suitable for facsimile reproduction, printer 26 will be of that type. Regardless of the type of printer chosen, envelope filler 26b of conventional type receives the output of printer 26a, places it in an envelope and seals it in an envelope. The finished project is then delivered to the addressee, along with other mail.

Figure 2:
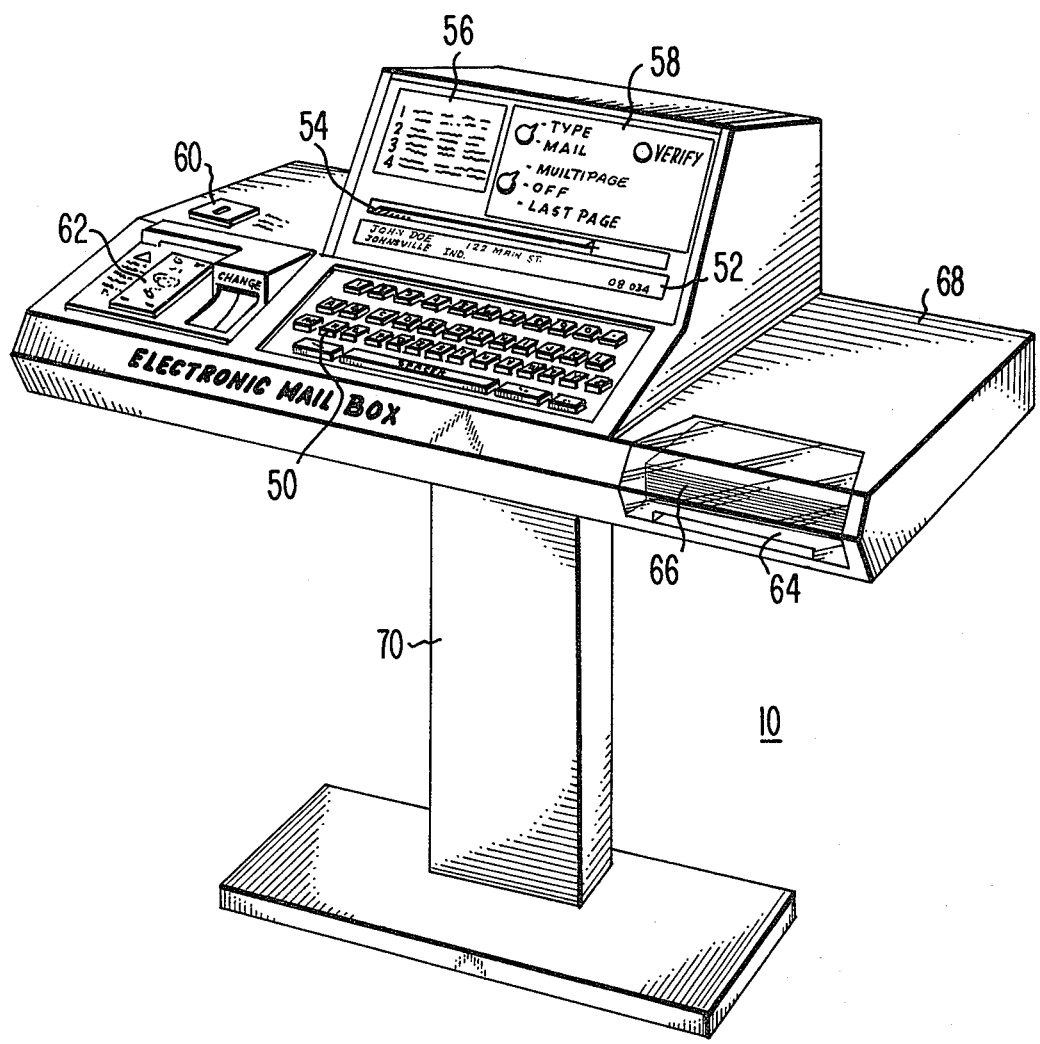
FIG. 2 is a perspective view of an electronic mail box constructed in accordance with the invention.

Turning next to FIG. 2, an EMB 10 is illustrated. It includes a keyboard 50 permitting entry by the customer of the addressee's name, street address, city, state and zip code. The keyboard may be a standard typewriter keyboard with electronic signal output or it may be a special keyboard human engineered for the convenience of the customers. EMB 10 also includes a display area 52, such as, for example, a cathode ray tube type display or a light emitting diode display for displaying information entered on the keyboard and a slot 54 into which letters to be electronically transmitted are inserted. A reject section 56 is also included, which displays types of errors found in data entered on keyboard 50 and errors made in entering the document into slot 54. For example, if the city and state do not agree with the zip code, a portion of area 56 will be illuminated instructing the customer to check for the correct city, state and zip code. Similarly, if the letter is entered upside-down or backwards, logic within the machine will detect this and other portions of section 56 will be illuminated to state the problem and solution. To the right of the reject section 56, (as illustrated in FIG. 2), is a control switch section 58. The purpose of the various switches will be described shortly. A coin slot 60 is adapted to receive coins to activate the machine. Additional features which are not specific requirements of an EMB may be included for convenience. For example, a bill changer 62 and a blank letter forms drawer 64 containing a supply of forms 66 and a writing surface 68 may also be included. The EMB may rest on a pedestal base 70, so that it is free-standing, or it may be adapted to rest on or at a desk (not shown).

EMB 10 includes the necessary electronics to asemble and transmit a message to a remote point, as illustrated in FIG. 3, to which attention is now directed. A document 100 is there illustrated inserted in slot 54 and is being wrapped around a sheet wrapping apparatus 102 to be thereafter read by an optical scanner 104. Sheet wrapping apparatus 102 may be of the type described in U.S. Pat. No. 3,908,981, issued Sept. 30, 1975 to S. Naroff, and assigned to the common assignee. The nature of the letter or document 100 will depend on the sophistication of optical scanning equipment 104 employed. For example, some optical scanners (this term is herein intended to encompass all the necessary logic to create meaningful electronic information signals as is known in the art) are capable of reading one or more type fonts as well as hand written characters, so long as the hand written characters are written in a constrained way. The electronic output will be binary in nature with one set of binary bits corresponding to each alphanumeric character of the scan. Alternately, optical scanning equipment 104 of the facsimile type may be provided, which produces electronic signals corresponding to alphanumerics, drawings, pictures, and the like on document 100. Therefore, the choice of scanners among those commercially available will depend on needs and economics. Regardless of the scanner chosen, it may be adapted to read only a portion of the page, ignoring, for example, the top 5 or 7 cm. which may contain information not desired to be transmitted. This section may, for example, include addressee information, which will be typed into keyboard 50. Alternatively, it may still be desirable for the purposes of sending a complete letter to also transmit the addressee information as part of the text of the letter.

Wrapping apparatus 102 is controlled by a letter entry control 106, which may be of the type described in the aforementioned patent to Naroff. Control 106 directs the wrapping and latter unwrapping of documents 100, and also signals optical scanner 104 via cable 108 to begin scanning. Letter entry control 106 may also be coupled to error display 56 to indicate document insertion errors. Scanner 104, which as stated previously, produces signals in binary form for each alphanumeric character read from document 100 or produces signals in analog form is coupled to error detection circuitry 110 via cable 112. Error checking circuitry 110 checks for errors in the signals received by it, such as for invalid combinations in binary code. As errors are detected, a signal is sent to optical scanner 104 via cable 114, causing the optical scanner to reread the document. In the absence of errors, the document's contents, now in electronic form, are passed to a buffer 116 to be therein stored for later transmission. Optical scanner 104 is also coupled to one input of NAND gates 118 and 120.

One output of a multipole multiposition switch 122 is also coupled to the second input terminal of NAND gate 118, while another output terminal of the switch is coupled to the second input terminal of NAND gate 120. There is a third (OFF) position of switch 122 to which it is automatically positioned at the end of a doucment scan. A second output of the switch directs operation of letter entry control 106 only when the switch is in one of its two non-off positions. The switch which is located in control switch section 58, FIG. 2, and set by the customer signals the EMB whether document 100 is simply one page of a multipage document or whether it is the last page (or only page of a signal page document).

The output terminal of NAND gate 120 is coupled to the set (S) terminal of flip-flop 124, to one input terminal of OR gate 126 and via encoder 125 to buffer 116. The output terminal of NAND gate 118 is coupled to a second input terminal of OR gate 126. The output terminal of OR gate 126 is coupled to letter entry control 106. The operation of elements 118, 120, 124, 125 and 126 is as follows. When the optical scanner completes the scan of a page, it sends a pulse to NAND gates 118 and 120, one of which, having been primed by the setting of switch 122, will be enabled. The resulting pulse will be transmitted via OR gate 126 to letter entry control 106, which, in turn, causes document 100 to be ejected from slot 54 and switch 122 to be set to OFF. Additionally, if switch 122 is set to the end of letter position, flip-flop 124 becomes set for reasons to be described and an end-of-letter code emitted by encoder 125 is entered into buffer 116.

A type-of-mail switch 130 located in control switch section 58 (see FIG. 2) is set by the customer to indicate regular, priority or registered mail. Depending on the switch position, one of the three encoders legended E will encode a unique code to be entered into buffer 116. Although not illustrated, switch 130 may be coupled to coin mechanism 132, illustrated at the left side of FIG. 3, to insure that the correct number of coins are inserted for the type of mail being requested. Coin mechanism 132, to which coin slot 60 (FIG. 2) is connected, may be coupled to letter entry control 106 and to keyboard 50 to prevent tampering by non-customers. Keyboard 50 is coupled to display 52, previously described, which also contains temporary storage permitting entry of addressee information.

The output terminals of display 52 are coupled to first input terminals of NAND gates 136 and 138, respectively. Verify switch 140, located in control switch section 58 (FIG. 2), is coupled to the second input terminal of NAND gate 138, the output terminal of which is coupled to error checking circuitry 142. Error checking circuitry 142 is coupled to error display 56 to indicate to the customer any errors and is coupled to the S terminal of flip-flop 144 to set the flip-flop in the absence of any errors. The Q output terminal of flip-flop 144 is coupled to a second input terminal of NAND gate 136, and via delay 146 to one input terminal of NAND gate 150. The Q terminal of flip-flop 124 is coupled to the second input terminal of NAND gate 150.

The output terminal of NAND gate 136 is coupled to the address storage portion of buffer 116, permitting entry of addressee information from temporary storage 52, when flip-flop 144 is set indicating no errors. The output terminal of buffer 116 is coupled to the third input terminal of NAND gate 150 and to an end-of-letter code detector 152. The output terminal of detector 152, legended EOL, is coupled to the reset terminals of flip-flops 124 and 144. The output terminal of NAND gate 150 is coupled to a modem 154, which may be of any conventional type. The modem is connected to any type telecommunications line connected to the local Post Office 20 (FIG. 1). In the case of an EMB located at the local Post Office, modem 154 may be unnecessary. In that situation, NAND gate 150 is coupled directly to multiplexer 18 (FIG. 1).

In operation, when a customer wishes to transmit the contents of a letter via an EMB 10, he inserts the proper coins into coin mechanism 132 through slot 60, for the type of mail and number of sheets being transmitted. He next positions switch 130 to the type of mail being sent. Switch 122 is set to indicate whether the document about to be inserted into slot 54 is a page other than the last page of a multipage document or it is the last page (or a single page document which is, of course, the last page). Then a document 100 is inserted into slot 54 under control of letter entry control 106. The document is wrapped onto sheet wrapping apparatus 102 and optical scanning begins. So long as there are no errors, information in electronic form is entered into buffer 116. If an error is detected, a pulse on line 114 causes the scanner 104 to reread the part of the document containing the error. In any event, when the scan of document 100 is complete, a pulse is transmitted to NAND gates 118 and 120, one of which is primed, depending on the setting of switch 122. If switch 122 is in PAGE position and therefore gate 118 is primed, a signal is sent to letter entry control 106 via OR gate 126, causing document 100 to be ejected. Then the next document is entered, switch 122 is set, and the process just described repeats. If on the other hand switch 122 is in END OF LETTER position and therefore gate 120 is primed, the document is ejected as stated above. Additionally, flip-flop 124 is set, indicating the entire contents of the letter have been read and are being stored in buffer 116. Finally, an end-of-letter code is entered into the buffer via encoder 125. Meanwhile, the customer is entering the address information on keyboard 50, which information is displayed and temporarily stored by device 52. When the customer is satisfied with the correctness of the information displayed, he pushes verify switch 140, which primes NAND gate 138 to pass information from storage 52 into error checking circuitry 142. If there is an error, such as for example, the zip code does not correspond to the city and state, an appropriate section of error display 56 will be illuminated requiring the customer to make a correction on the keyboard and to again depress verify switch 140. If the address information contains no error, error checking circuitry 142 produces a pulse to set flip-flop 144, the Q output of which primes NAND gate 136, permitting the entry of the address information into buffer 116. After a short delay in delay 146 permitting time for the entry into the buffer of the address, a prime signal is applied to gate 150. Assuming that the scan of the letter is complete, flip-flop 124 will also be set placing a second prime on gate 150. Thereafter, information will be transferred serially out of buffer 116 through gate 150 and modem 154 to the multiplexer 18 (FIG. 1), beginning with the address portion followed by the letter portion, the type of mail code and ending with the end-of-letter code (EOL). At the same time as the EOL code passes through gate 150, it also is sensed and decoded be decoder 152, which produces a pulse to reset flip-flops 124 and 144 terminating the signals into modem 154.

It will, of course, be appreciated by those skilled in the art that additional timing logic must be added to what has been disclosed to make a commercially practicable device. Since such logic is available in the present state of the art, in itself forms no part of the present invention, and would unduly complicate the description and drawings, a detailed discussion thereof is omitted for reasons of clarity.

What is claimed is:

1. Apparatus for electronically mailing a document comprising in combination:
   means for receiving said document containing information in printed form to be transmitted to a remote point;
   means for reading said information and converting it to electronic signals;
   keyboard means permitting entry by an operator of the address to which said information is to be transmitted, said address being manifested as electronic address signals;
   storage means receptive of said information electronic signals and said electronic address signals for storing the same;
   means coupled to said storage means and responsive to said signals stored therein for transmitting to said remote point, determined by said electronic address signals corresponding to an address entered into said keyboard, said electronic address signals and said information electronic signals;
   wherein said address includes postal zip code, city and state of the addressee, and wherein said apparatus for electronically mailing a document further includes means for verifying that said city and state correspond to said zip code and means for prohibiting said transmission to said remote point in the absence of said correspondence and further including means for notifying said operator of at least one of the lack or presence of said correspondence; and
   means for producing a signal indicative of the determination that said electronic address signals and said information electronic signals are stored in said storage means and wherein said transmitting means includes means for permitting said transmission only when said determination indicating signal has been produced.

2. The combination as set forth in claim 1, further including at said remote point, means for reproducing said information on a document in printed form.

3. The combination as set forth in claim 1, wherein said information is in the form of alphanumeric characters and wherein said reading means includes means for converting each alphanumeric character to a corresponding digital code.

4. The combination as set forth in claim 1, further including means for ejecting said document after it has been read.

5. The combination as set forth in claim 1 further including means for accepting money and for permitting said reading means to read only after a required amount of money has been inserted in said money accepting means.

6. An electronic mailbox comprising in combination:
   means for accepting a letter comprising alphanumeric characters which are to be transmitted to a remote point;
   means for optically reading said letter and for translating each alphanumeric character therein contained to digital form;
   means for storing in digital form each alphanumeric character read from said letter to be transmitted to said remote point;
   keyboard means permitting entry by an operator of addressee information comprising the name, address, and zip code of the person to whom said letter is to be transmitted said information upon entry being manifested in electronic form;
   means for storing said addressee information;
   means for comparing the address with the zip code to ascertain that said zip code corresponds with said address and for notifying said operator if correspondence is not obtained;
   means for producing a signal indicating that said alpha-numeric characters and said addressee information are stored;
   means responsive to said signal from said signal producing means for transmitting to said remote point, corresponding to said address and zip code, addressee information as stored in said addressee storage and information stored in digital form;
   means located at said remote point for recreating a letter copy similar to that entered into said electronic mailbox; and
   means for ejecting said letter after it has been read.

* * * * *